(12) United States Patent
Schulte

(10) Patent No.: US 8,407,963 B2
(45) Date of Patent: Apr. 2, 2013

(54) FLOOR COVERING

(76) Inventor: Guido Schulte, Rüthen-Meiste (DE)

( * ) Notice: Subject to any disclaimer, the term of this patent is extended or adjusted under 35 U.S.C. 154(b) by 0 days.

(21) Appl. No.: 13/062,099

(22) PCT Filed: Aug. 27, 2009

(86) PCT No.: PCT/DE2009/001208
§ 371 (c)(1),
(2), (4) Date: Mar. 3, 2011

(87) PCT Pub. No.: WO2010/028621
PCT Pub. Date: Mar. 18, 2010

(65) Prior Publication Data
US 2011/0162312 A1    Jul. 7, 2011

(30) Foreign Application Priority Data

Sep. 12, 2008   (DE) .......................... 10 2008 047 099

(51) Int. Cl.
*E04B 2/00* (2006.01)
(52) U.S. Cl. ....... 52/582.1; 52/391; 52/582.2; 52/588.1; 403/320; 403/409.1
(58) Field of Classification Search ................. 52/582.1, 52/582.2, 592.1; 403/409.1, 320
See application file for complete search history.

(56) References Cited

U.S. PATENT DOCUMENTS 7,121,058 B2 * 10/2006 Palsson et al. ............... 52/592.2

(Continued)

FOREIGN PATENT DOCUMENTS

EP         1 650 375 A1    4/2006
WO    WO 2008/004960    1/2008

(Continued)

*Primary Examiner* — Brian Glessner
*Assistant Examiner* — Joshua Ihezie
(74) *Attorney, Agent, or Firm* — Henry M Feiereisen LLC

(57) ABSTRACT

Disclosed is a floor covering consisting of a plurality of panel elements (1) that can be laid in combination with each other. On the front sides (2, 3) and longitudinal sides (4, 5), the panel elements (1) have locking strips (6, 7) that engage with each other in the assembled position in a covering in which panel elements (1) adjoin each other. The front sides (2, 3) of the panel elements (1) have grooves (19, 20). The grooves (19, 20) of two abutting front sides (2, 3) are aligned and form a locking channel (21) for accommodating a front spring (22) that is pre-assembled in one of the grooves (20). The front spring (22) projects from an end of the groove (20) that faces the longitudinal side (5) of the panel element (1) and can be moved in part from one groove (20) into the corresponding groove (19) of the adjoining panel element (1) by sliding the projecting end (24) of the front spring (22) into the groove (20). The groove (20) that accommodates the front spring (22) has at least one recess (45) within which a stop surface (25) is formed and into which a cam (43) of the front spring (22) engages. The front spring (22) has a wavy shape. The wavy sides of the front spring (22) face a decorative side and a bottom side of the panel elements (1). The orientation of the troughs (27) and crests (26) of the wavy zones (28, 29) should correspond to the direction of travel (V) of the front spring (22) when the front spring (22) is slid into the recess (45) and the cam (43) rests thereagainst.

13 Claims, 2 Drawing Sheets

U.S. PATENT DOCUMENTS

| | | | |
|---|---|---|---|
| 7,332,053 B2 * | 2/2008 | Palsson et al. | 156/305 |
| 7,726,088 B2 * | 6/2010 | Muehlebach | 52/582.1 |
| 2004/0211143 A1 * | 10/2004 | Hanning | 52/578 |
| 2007/0028547 A1 * | 2/2007 | Grafenauer et al. | 52/586.1 |
| 2008/0110125 A1 * | 5/2008 | Pervan | 52/582.2 |
| 2010/0281803 A1 * | 11/2010 | Cappelle | 52/309.1 |
| 2011/0167751 A1 * | 7/2011 | Engstrom | 52/588.1 |

FOREIGN PATENT DOCUMENTS

| | | |
|---|---|---|
| WO | WO 2008/017301 | 2/2008 |

\* cited by examiner

FLOOR COVERING

CROSS-REFERENCES TO RELATED APPLICATIONS

This application is the U.S. National Stage of International Application No. PCT/DE2009/001208, filed Aug. 27, 2009, which designated the United States and has been published as International Publication No. WO 2010/028621 and which claims the priority of German Patent Application, Serial No. 10 2008 047 099.6, filed Sept. 12, 2008, pursuant to 35 U.S.C. 119(a)-(d).

BACKGROUND OF THE INVENTION

The invention relates to a floor covering composed of interlocked panel elements.

According to WO 2008/017301 A2, floor coverings made of a plurality of interconnected panel elements, which have interlocking rails at their head sides and the longitudinal sides engaging in the installed position with adjacent panel elements of a floor covering are known in the art. Grooves are provided in the head sides, wherein the grooves of two abutting head sides correspond with each other and form a locking channel for receiving a head spring. The head spring is preinstalled in the groove and protrudes over an end of the groove facing the longitudinal side of the panel element. At the same time, the head spring is in the preinstalled state completely housed inside the groove and can be moved at least partially from one groove into the corresponding groove of the adjacent panel element by displacing the protruding end of the head spring into the groove. The floor covering composed of panel elements advantageously obviates the need for subsequent driving in or inserting the head springs into the locking channel. The insertion operation is performed in the factory.

While insertion of the head springs in the factory with a machine does not pose a problem, it must be ensured when installing the floor covering that the head springs are, on one hand, easily displaceable and, on the other hand, do not allow movement of the abutting head sides in the vertical direction, which would lead to an undesirable height offset on the side that is visible, in particular when a load is applied to the panel elements near the head sides. The head springs should therefore, on one hand, be very firmly seated and, on the other hand, be easily movable.

It is an object of the invention to provide a floor covering made of panel elements having head-side displacement springs, which can be easily displaced and minimize, under load applied to the floor covering, a height offset in the region of the head sides, thereby improving the application of the floor covering.

SUMMARY OF THE INVENTION

This object is attained with a floor covering having a plurality of interconnected panel elements. A panel element has a head side and a longitudinal side, a locking rail arranged on the head side and on the longitudinal side and constructed to engage in an installation position with a corresponding locking rail of an adjacent panel element in the floor covering, and a groove arranged in the head side and having ends facing the longitudinal side of the panel element, with the grooves in the head sides of two abutting panel elements of the floor covering being aligned and forming a locking channel. A head spring is preinstalled in one of the grooves of the two abutting head sides. The head spring has ends and at least one undulated region facing a decorated side and a bottom side of the panel elements, wherein the at least one undulated region forms wave troughs and wave crests. The head spring also has a cam in engagement with the groove, wherein the groove in which the head spring is installed has at least one recess with a run-up face formed in the at least one recess. The head spring has an end protruding from the end of the groove, allowing it to be moved in the locking channel from the groove in one panel element into the groove of the abutting panel element by moving the protruding end of the head spring into the groove. The wave troughs and the wave crests define a movement direction of the head spring through contact between the head spring and the cam, wherein the movement direction is diagonal to the head side of the panel element.

Importantly, the head spring in the floor covering according to the invention is undulated in a particular way. The orientation of wave troughs and wave crests of the undulated regions hereby corresponds to the movement direction of the head spring, when the head spring is moved in the recess through contact with the cam.

Although WO 2008/017301 A2 discloses to employ undulated head springs which can altogether be partially moved from one groove into the corresponding other groove, the wave crests and wave troughs in WO 2008/017301 A2 do not extend in the movement direction of the head spring, when the head spring is moved in the installation position in the recess through contact with the cam. The recess forms a ramp on which the cam runs up. Depending on the slope of the cam and the recess, a resulting movement direction is composed of a transverse displacement and a longitudinal displacement and is determined by the orientation of the contact region between cam and recess. A resulting movement direction is always diagonal to the head side of the panel element.

The dynamic friction forces between the head spring and the groove walls can be minimized by orienting the wave crests, or the respective wave peak of a wave crest, commensurate with the resulting movement direction of the head spring. The wave crests and wave troughs are then oriented at an angle. Although they now have a somewhat greater length than if they were to extend at a right angle relative to the longitudinal axis of the head spring, this is negligible in view of the advantages attained with the reduced dynamic friction resistance.

As a result of the angled orientation of the wave crests and wave troughs, the head spring comes into contact with a smaller number of surface regions of the grooves and can therefore be much more easily displaced. This reduction of the dynamic friction forces can advantageously be used to select tighter tolerances between the groove and the spring, i.e., the head spring can be made somewhat thicker. The head spring is then seated more tightly in the grooves, with the result that the head spring is not canted inside the groove even under load, thus eliminating an objectionable offset on the visible side of the panel elements. The resulting installation is improved without making the installation more difficult.

The travel in the longitudinal direction of the head groove is preferably less than 10 mm and ideally as large as the width of the spring on the longitudinal side of a panel element, i.e., for example 1.5 to 4 mm. The actuation section of the head spring protruding from the head groove should not protrude over the outermost edge of the panel element, i.e., in particular not over a lower locking rail. In the locked position, the head spring is located entirely inside the head groove.

Within the context of the invention, a head side refers to a front side of a panel element. The head side is typically the shorter side of the panel element; however, square panel elements also have a head side with head spring and longitudinal sides.

The run-up face is a contour in form of a recess in the groove. The recess itself is arranged in the groove bottom. In particular, the recess can be produced with a saw cut, so that the recess has the contour of a segment of a circle. The segment of the circle can also be rounded in its transition regions to the groove bottom, thereby producing a recess with a sinusoidal shape. This is a result of the production process, because the individual panel elements move during processing parallel to the saw blade which is used to introduce the recess. Unless this movement occurs completely synchronously, the edge region is smoothed, thus producing rounded transitions. Important is the function of the run-up face, namely that it functions as a contoured abutment to effect a lateral displacement of the head spring during its longitudinal displacement.

Alternatively, the recess may also be a rectangular pocket produced with an end mill, or only a bore hole in the groove bottom, wherein the run-up face of a bore is limited to the edge of the bore hole; with this arrangement, cams protruding into the bore make only point-wise contact with the slope.

The inventive concept can be applied to all types of floor covering systems having a top cover arranged on a support, for example genuine wood coverings, laminate, a support with varnished surfaces as a top cover, linoleum, cork on support plates, etc. In particular the cover layer can be made of a decorative paper with overlay, which determines the visual appearance of the panel element. The floor covering may therefore be a parquet floor, a prefinished parquet floor, a genuine wood floor or a laminate floor.

BRIEF DESCRIPTION OF THE DRAWING

Advantageous embodiments of the invention are recited in the dependent claims, the content of which will be described in more detail hereinafter with reference to the exemplary embodiments illustrated in the drawings. It is shown in:

DETAILED DESCRIPTION OF PREFERRED EMBODIMENTS

Figure 1:
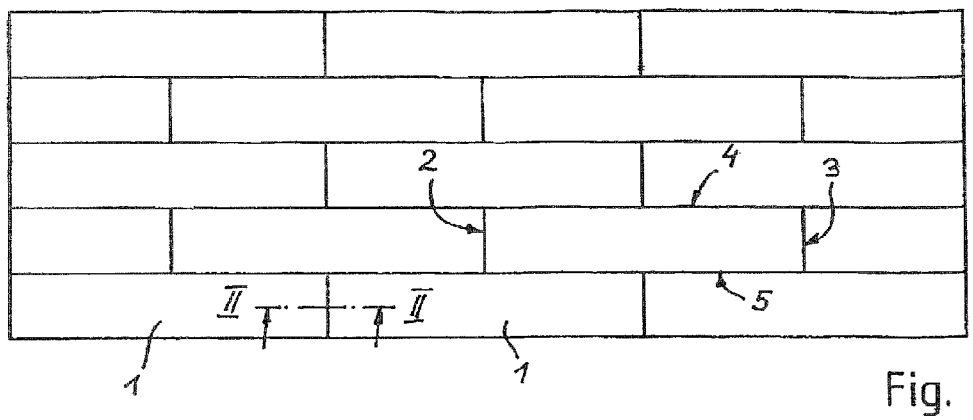
FIG. 1 a detail of a floor covering in a top view.

FIG. 1 shows a floor covering made of the plurality of interlocked rectangular panel elements 1. The panel elements 1 have locking rails on their respective head sides 2, 3 and on their respective longitudinal sides 4, 5. The locking rails of adjacent panels in the covering engage with each other in the installation position.

Figure 2:
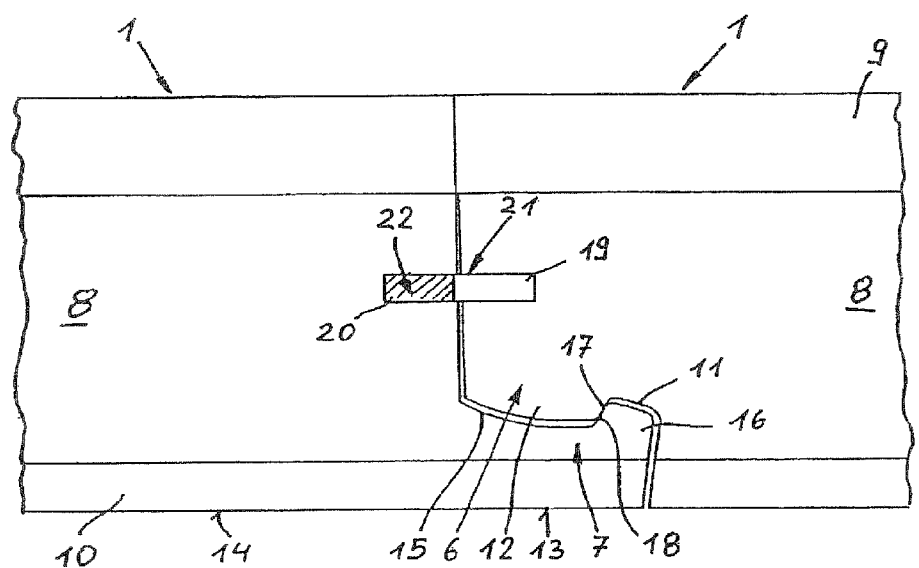
FIG. 2 in a side view, a vertical section through the head-side joint region between two panel elements taken along the line II-II in FIG. 1.

Locking rails 6, 7 on the head sides 2 and 3, respectively, of a panel element 1 are illustrated in FIG. 2. FIG. 2 shows a vertical cross-section through the head-side joint region between two panel elements 1, when viewing the connection at the head sides 2, 3. The unillustrated locking rails on the longitudinal sides of a panel element 1 may be configured different from the locking rails 6, 7.

A panel element 1 is made of a support layer 8 made of fiber material, typically a highly or moderately compacted fiber plate, wherein the support layer 8 has a top-side cover layer 9 and a bottom-side back pull 10. The cover layer may be made from a decorative paper with an overly which determines the visual appearance of the floor covering panels 1.

The so-called overlay or the sealing forms a useful layer with a special resin which makes the surface of the floor covering panels 1 very durable. The back pull 10 on the bottom side of the support layer 8 provides dimensional stability and blocks moisture.

Each panel element 1 has a locking rail 6 (first locking rail) at one head side 2 (first head side) and a locking rail 7 (second locking rail) at the opposite head side 3 (second head side). The first locking rail 6 has a first coupling channel 11, which is open downward, and a downwardly pointing end-side first coupling bead 12. The second locking rail 7 is arranged at the bottom on the opposite second head side 3 of a panel element 1 and protrudes relative to the support layer 8. The bottom side 13 of the second locking rail 7 extends in the plane of the bottom side 14 of the panel element 1. The second locking rail 7 has a second coupling channel 15, which is open downward, and an upwardly oriented end-side second coupling bead 16.

When the first locking rail 6 and the second locking rail 7 interlock, the first coupling bead 12 engages in the second coupling channel 15 and the second coupling bead 16 engages in the first coupling channel 11. The opposing flanks 17, 18 of the first coupling bead 12 and of the second coupling bead 16, which are sloped in the same direction, contact each other. This creates a pressure point on the flanks 17, 18 which generates a force that causes the two panel elements 12 to be pulled together in the region of the cover layer 9, thereby producing an almost jointless transition in the joint region of the two floor covering panels 1 on the cover layer 9.

Grooves 19, 20 which extend over the entire length of the head sides 2, 3 are formed in the head sides 2, 3 of the panel elements 1. As seen in FIG. 2, the grooves 19, 20 of the abutting head side 2, 3 correspond to each other and form a locking channel 21. A head spring 22 (illustrated by hatching) is pushed into this locking channel 21. The grooves 19, 20 in the head sides 2, 3 are disposed above the locking rails 6, 7 in the support layer 8.

Figure 3:
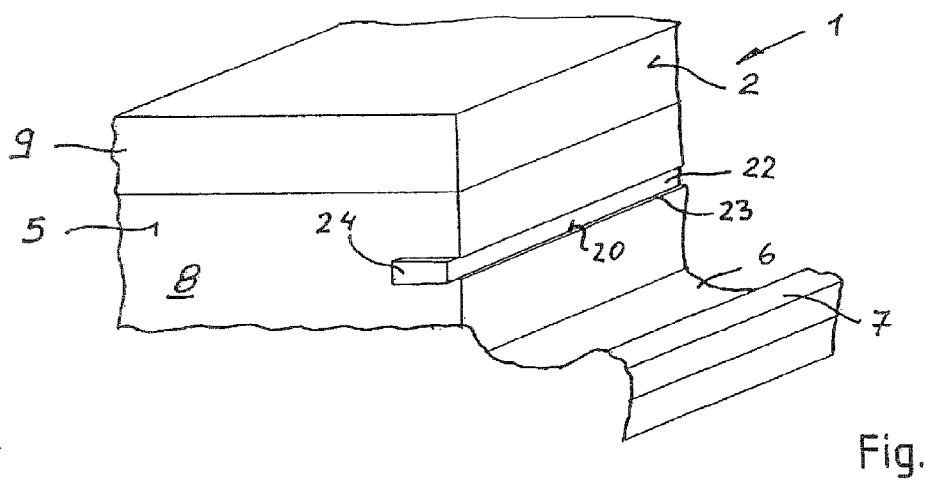
FIG. 3 a perspective view of the corner region of a panel element, as viewed towards the head side.

FIG. 3 shows a perspective diagram as viewed towards the head side 2 of a panel element 1. This diagram shows that in the preinstalled position the head spring 22 is disposed completely inside the groove 20, and in particular does not protrude over the head-side groove opening 23. However, the end 24 of the head spring 22 protrudes from the groove 20 in the region of the longitudinal side 5. FIG. 3 shows only an exemplary arrangement of the head spring 22 in the groove 20. The functionality as well as possible embodiments of the head spring will be described below with reference to FIGS. 4 and 5.

Figure 4:
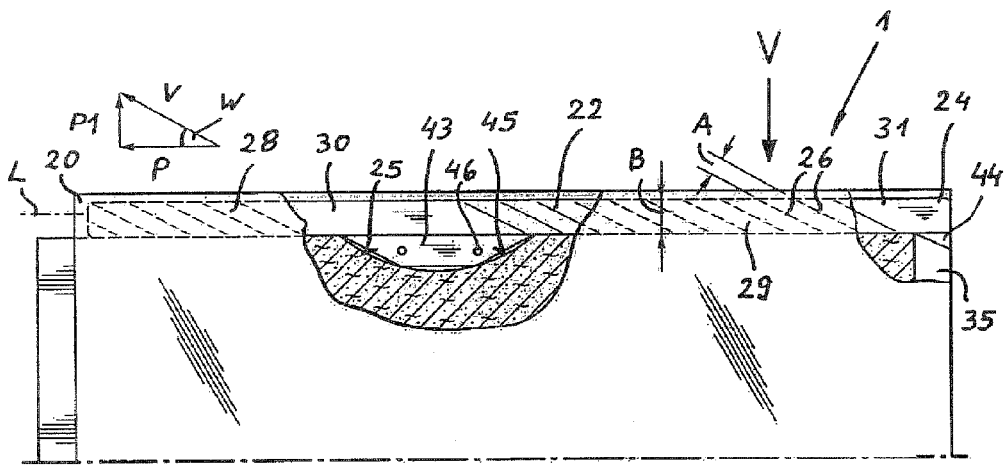
FIG. 4 a top view on a head side of a panel element, shown in partial cross-section with a spring.

FIG. 4 illustrates an embodiment of a head spring 22 which is likewise located in a groove 20 of the panel element and is likewise displaced in the direction of the arrow P when two panel elements are interlocked, with the head spring 22 exiting the groove 20 in the direction of the arrow P1. The movement direction V results from the arrows P and P1. The angle W is preferably between 25° and 30° in relation to the longitudinal axis L of the head spring 22 which coincides with the direction of the arrow P.

The resulting movement direction V determines the orientation of wave crests 26 and wave troughs 27 in the undulated regions 28 and 29 of the head spring 22. A non-undulated region 30 is disposed approximately at the center between the undulated regions 28 and 29. An additional non-undulated region 31 is located at the end 24 of the head spring 22.

The wave crests 26 and wave troughs 27 extend parallel to the movement direction V.

In FIG. 4, A indicates the shortest distance between two adjacent wave crests 26 and B the width of the head spring 22. It can be seen that A is smaller than B.

The movement direction V of the head spring 22 is caused by two cams 43, 44 which extend in the direction of the groove bottom of the groove 20. A first cam 43 is located in the transition region from the center to the (in the drawing plane) left third of the head spring 22. The cam 43 has a trapezoidal shape and extends into a recess 45 which is configured as a segment of a circle. The trapezoidal shape and the adaptation of the cam 43 to the length of the recess, respectively, safely prevents the head spring from accidentally sliding in one or the other direction and is used to orient the position inside the groove 20. The short side of the trapeze, which is inserted in the groove 20 first, is preferably beveled towards the top side and the bottom side to form an insertion ramp for facilitating insertion of the head spring 22 into the groove 20.

The recess 45 can be produced, for example, by a disk-shaped saw blade which has been inserted into the groove 20. The cam 43 is matched to the depth of the recess 45, so that the head spring 22 contacts the groove bottom in the unlocked state. The front end 24 of the head spring 22 then does not protrude over the panel element 1. The second cam 44 which extends in the longitudinal coupling channel 35 is disposed at this front end. This cam 44 runs up on the 90° corner in the transition region between the longitudinal coupling channel 35 and the front side groove 20. Because the distance of travel is short, this second cam 44 is shorter and does not protrude as far towards the coupling channel 35 as the cam 43 in the provided recess 45. The geometries of the cams 43, 44 can be matched to each other so as to allow parallel displacement of the head spring 22.

The protruding end 24 of the head spring 22 can also point in the direction of already installed panel elements 1, meaning in the opposite direction. In this situation, the end 24 engages with already installed panel elements 1, so that the new row of panel elements 1 is interlocked by the already installed panel elements 1. This is beneficial when installing the last or edge row where the direction of thrust is advantageously reversed, so that the ends 24 of the head spring 22 are partially pushed or moved from the other side from the one groove 20 into the corresponding groove 19 of the adjacent panel element (counter-thrust direction).

Figure 5:
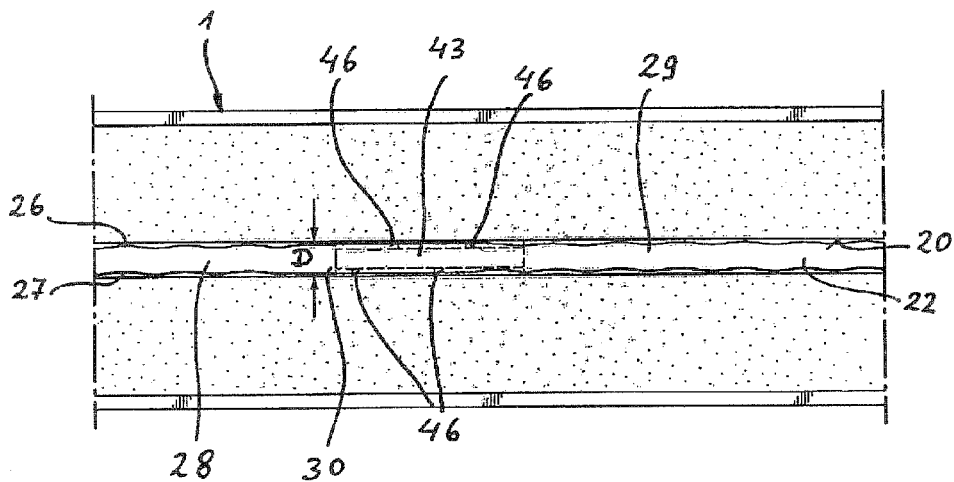
FIG. 5 the head side of the panel element as viewed in the direction of the arrow V of FIG. 4.

FIGS. 4 and 5 also show several clamping pins 46 distributed in the region of the cam 43. The clamping pins 46 are small projections on the top side and/or bottom side of the cam 43 and are used to hold the head spring 22 in the illustrated clamped position.

FIG. 5 shows the head spring 22 in a front view. This perspective view clearly shows that regions of the head spring 22 are undulated towards the top side and bottom side of the groove 22, thereby decreasing the size of the contact areas between the head spring 22 and the groove 20 to reduce friction. As can also be seen, the clamping pins 46 are arranged with a mutual offset both on the top side as on the bottom side of the head spring 22 and hold the head spring 22 inside the groove 20. It is also apparent that the cam 43 indicated with a dashed line has a thickness that is smaller than the thickness D of the base body of the head spring 22, making the friction between the cam 43 and the slope inside the recess 45 as small as possible. It can also be seen that the wall thickness in the undulated regions is not the same as the thickness of the head spring 22. The thickness D in the undulated regions is less than the thickness in the non-undulated regions.

The invention claimed is:

1. A floor covering having a plurality of interconnected panel elements, a panel element comprising:
   a head side and a longitudinal side,
   a locking rail arranged on the head side and on the longitudinal side and constructed to engage in an installation position with a corresponding locking rail of an adjacent panel element in the floor covering,
   a groove arranged in the head side and having ends facing the longitudinal side of the panel element, with the grooves in the head sides of two abutting panel elements of the floor covering being aligned and forming a locking channel,
   a head spring preinstalled in one of the grooves of the two abutting head sides and having ends and at least one undulated region facing a decorated side and a bottom side of the panel elements, said at least one undulated region forming wave troughs and wave crests sequentially arranged in a longitudinal direction of the head spring, the head spring integrally formed with two cams in engagement with the groove, wherein the groove in which the head spring is installed has at least one recess with a first run-up face formed in the at least one recess for a first of the two cams and a second run-up face disposed at a front side of the groove,
   wherein the head spring has an end protruding from the end of the groove and is movable in the locking channel from the groove in one panel element into the groove of the abutting panel element by moving the protruding end of the head spring into the groove,
   whereby applying a force to the protruding end of the head spring in a longitudinal direction of the groove forces the first and second cams to ride up on the respective first and second run-up faces, thereby moving the entire head spring in a direction diagonal to the head side of the panel element out of the groove and into a corresponding groove of the adjacent panel element, resulting in interlocked panels,
   wherein the head spring has at least one non-undulated region.

2. The floor covering of claim 1, wherein the wave crests and the wave troughs form an angle of 20° to 45° with respect to a longitudinal axis of the head spring.

3. The floor covering of claim 1, wherein the wave crests and the wave troughs form an angle of 25° to 30° with respect to a longitudinal axis of the head spring.

4. The floor covering of claim 1, wherein a shortest spacing between two adjacent wave crests of the head spring is smaller than a width of the head spring.

5. The floor covering of claim 4, wherein a ratio of the shortest spacing to the width of the head spring is less than 1:2.

6. The floor covering of claim 1, wherein the at least one non-undulated region is arranged between two undulated regions and spaced apart from the ends of the head spring.

7. The floor covering of claim 1, wherein the at least one non-undulated region is arranged at one end of the head spring.

8. The floor covering of claim 1, wherein an overall length of the at least one undulated region is greater than an overall length of the at least one non-undulated region.

9. The floor covering of claim 1, wherein an overall length of the at least one undulated region is at least twice an overall length of the at least one non-undulated region.

10. The floor covering of claim 1, wherein the head spring has a greater thickness in the at least one non-undulated region than in the at least one undulated region.

11. The floor covering of claim 1, wherein the head spring is movable in the locking channel in a thrust direction or a counter-thrust direction.

12. The floor covering of claim 1, wherein at least one of the two cams comprises pins protruding from a top side and a bottom side of the cam toward sidewalls of the groove and wherein a thickness of the at least one cam is smaller than a thickness of the at least one non-undulated region of the head spring, with the pins making point-wise contact with the sidewalls of the groove so as to prevent lateral movement of the head spring in the groove.

13. The floor covering of claim 12, wherein the at least one cam has a substantially trapezoidal structure.

* * * * *